United States Patent [19]

Galloway et al.

[11] Patent Number: 5,245,525
[45] Date of Patent: Sep. 14, 1993

[54] DC CURRENT CONTROL THROUGH AN INTERPHASE TRANSFORMER USING DIFFERENTIAL CURRENT SENSING

[75] Inventors: Gary L. Galloway, Rockford; Thomas S. Latos, Huntley; Derrick Roe, Rockford, all of Ill.

[73] Assignee: Sundstrand Corporation, Rockford, Ill.

[21] Appl. No.: 781,919

[22] Filed: Oct. 24, 1991

[51] Int. Cl.$^5$ ............................................. H02M 7/48
[52] U.S. Cl. ................................... 363/71; 363/65; 307/82
[58] Field of Search ............... 363/65, 71, 72; 307/82

[56] References Cited

U.S. PATENT DOCUMENTS

| | | | |
|---|---|---|---|
| 4,149,233 | 4/1979 | Nagano | 363/71 |
| 4,529,925 | 7/1985 | Tanaka et al. | 363/161 |
| 4,677,535 | 6/1987 | Kawabata et al. | 307/82 |
| 4,748,340 | 5/1988 | Schmidt | 363/71 |
| 4,764,859 | 8/1988 | Matsui et al. | 363/161 |
| 4,802,079 | 1/1989 | Mizoguchi | 363/71 |
| 4,882,120 | 11/1989 | Roe et al. | 363/98 |
| 4,947,310 | 8/1990 | Kawabata et al. | 363/71 |
| 5,036,452 | 7/1991 | Loftus | 307/82 |

*Primary Examiner*—J. L. Sterrett
*Attorney, Agent, or Firm*—Wood, Phillips, VanSanten, Hoffman & Ertel

[57] ABSTRACT

The problem of minimizing DC content in a dual converter system (18) is addressed with dual inverters (36,38) having outputs connected in parallel through an interphase transformer (42). In order to minimize DC current flow through the transformer (42) caused by non-ideal switching characteristics, a current transducer (44) senses primary current out of each inverter (36,38). Particularly, the current transducer (44) comprises a current transformer which senses the currents differentially. This sensing removes load current so that the sensed current represents interphase transformer excitation current and DC current. The excitation current is eliminated by filtering and averaging resulting in a DC signal proportional to DC current through the interphase transformer (42), which is transferred to a control processor (40) which modifies PWM patterns sent to the inverters (36,38) to reduce the DC current.

7 Claims, 2 Drawing Sheets

DC CURRENT CONTROL THROUGH AN INTERPHASE TRANSFORMER USING DIFFERENTIAL CURRENT SENSING

FIELD OF THE INVENTION

This invention relates to electrical power systems and, more particularly, to a control for limiting DC content in a dual converter VSCF system.

BACKGROUND OF THE INVENTION

Conventional electrical power systems utilize a synchronous electrical generator for generating AC power. Such a generator may include a rotor and a stator having a stator coil. In applications such as an aircraft, the rotor is driven by an engine such that electrical power is developed in the stator coil. Owing to the variation in engine speed, the frequency of the power developed in the generator winding is similarly variable. This variable frequency power is converted to constant frequency power using a variable speed constant frequency (VSCF) system including a power converter which may develop, for example, 115/200 $V_{AC}$ power at 400 Hz.

A typical converter includes an AC to DC converter, such as a rectifier, connectable through a DC link having a filter to a DC to AC converter, such as an inverter. The output of the inverter comprises constant frequency power which is applied through a high frequency filter to an AC bus. Typically, the converter is controlled by a pulse width modulation (PWM) control signal to focus energy at the fundamental frequency and to suppress harmonics. The number of harmonics controllable is a function of switching frequency. However, loss is also proportional to switching frequency. Therefore, it is necessary to limit the number of pulses on any given switch. Typically, seven pulses are used, one to control the magnitude at the fundamental frequency and the others to control six harmonics. With a single inverter, this eliminates the third through thirteenth harmonics A high frequency filter is used to reduce the higher harmonics. However, it is desirable to minimize the filter size.

Higher power requirements cannot always be met with a conventional power system. In certain applications, dual, parallel parts may be used. For example, dual inverters controlled identically may be connected in parallel. Ideally, the dual inverters are controlled so that loading is split equally between the two. For connection of the same in parallel, the corresponding phase outputs of each may be connected through an interphase transformer. With an interphase transformer, if the DC component on each inverter output is unequal, then a DC current flows through the interphase transformer. The amount of magnetic flux swing changes as a result of this current. Therefore, it is desirable to eliminate the DC current flowing through the interphase transformer.

The present invention is intended to overcome one or more of the problems as set forth above.

SUMMARY OF THE INVENTION

In accordance with the present invention, a dual inverter system is controlled to minimize DC content in the inverter output.

Broadly, there is disclosed herein an electric power system with dual inverters having outputs connected in parallel to an inductive element for connection to a load. A control therefor comprises a current transducer operatively associated with the outputs of both inverters for sensing differential current from the inverters. An inverter control is connected to the current transducer for developing pulse width modulated control signals to the inverters to reduce differential current sensed by the current transducer.

It is a feature of the invention that the current transducer comprises a current transformer sensing output from one inverter differentially from that of the other inverter.

It is another feature of the invention to provide a filter circuit connected between the current transducer and the inverter control, the filter developing a signal proportional to DC current flowing through the inductive element.

It is a further feature of the invention that the inverter control modifies the pulse width modulated control signals to minimize DC current flowing through the inductive element.

It is still another feature of the invention that the inverter control phase shifts control of the one inverter 180 electrical degrees relative to the other inverter.

There is disclosed in accordance with another aspect of the invention a DC content control for dual pulse width modulated inverters having outputs connected in parallel to an interphase transformer for connection to a load. The control comprises a current transducer means operatively associated with the outputs of both inverters for sensing DC current flowing in the interphase transformer and an inverter control connected to the current transducer means for developing pulse width modulated control signals to the inverters to reduce DC current sensed by the current transducer means.

More particularly, the disclosed invention relates to an electric power system with dual inverters having outputs connected in parallel through an interphase transformer for connection to a load. In order to minimize DC current flow through the transformer caused by non-ideal switching characteristics, a current transducer senses primary current out of each inverter. Particularly, the current transducer comprises a current transformer which senses the currents differentially. This sensing removes load current so that the sensed current represents interphase transformer excitation current and DC current. The excitation current is eliminated by filtering and averaging resulting in a DC signal proportional to DC current through the interphase transformer, which is transferred to a control processor which modifies PWM patterns sent to the inverters to reduce the DC current.

Further features and advantages of this invention will readily be apparent from the specification and from the drawings.

DETAILED DESCRIPTION OF THE INVENTION

Figure 1:
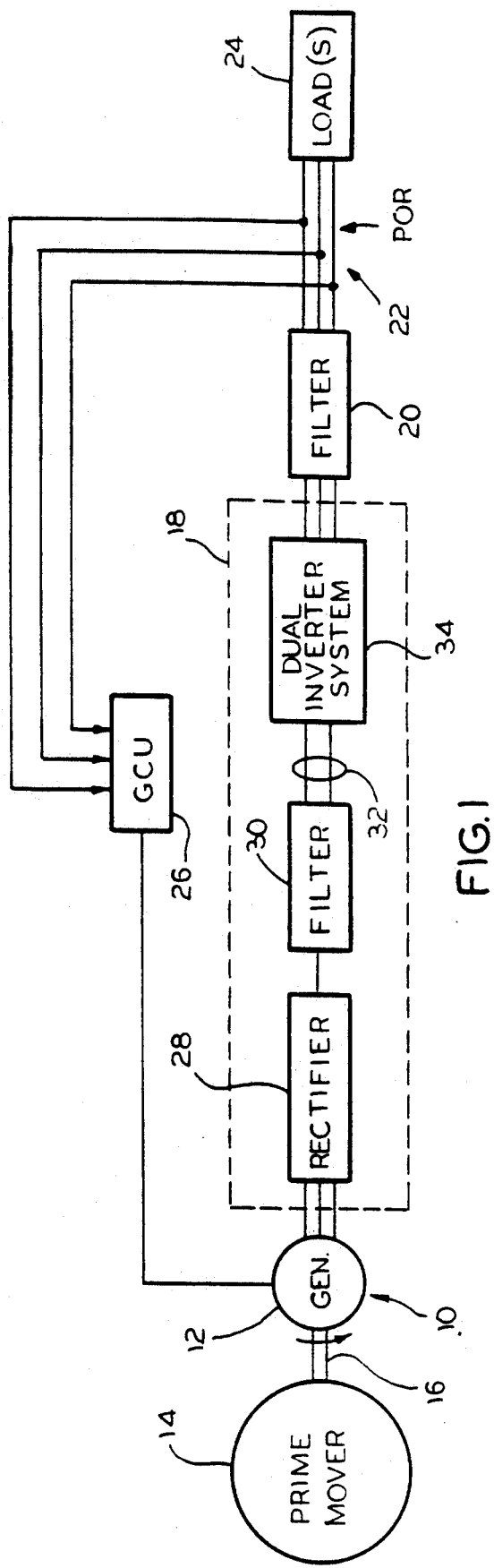
FIG. 1 is a block diagram of a VSCF system incorporating the control of the present invention.

Referring first to FIG. 1, an electrical power system 10 includes a generator 12 driven by a prime mover 14 via a shaft 16. Although not shown, the generator 12 includes a permanent magnet generator, an exciter and a main generator all driven by the prime mover 14 through the shaft 16.

The generator 12 develops polyphase output power which is delivered to a converter 18. The converter 18 develops constant frequency power which is coupled through a high frequency filter 20 to an AC bus 22 for powering loads, represented typically at 24.

In a typical application, the prime mover 14 is the main engine in an aircraft, and the converter 18 is part of a variable speed constant frequency (VSCF) system for delivering constant frequency power to the AC bus 22 for powering aircraft loads 24, as controlled by a generator control unit 26.

The converter 18 includes an AC/DC converter 28 connected through a DC filter 30 and DC link 32 to a DC/AC converter 34. Particularly, according to the illustrated embodiment of the invention, the AC/DC converter 28 comprises a full wave bridge rectifier circuit of conventional construction which is operable to convert three-phase AC power to DC power. The DC/AC converter 34 comprises a dual inverter system comprising dual pulse width modulation (PWM) inverter circuits, as discussed below.

Figure 2:
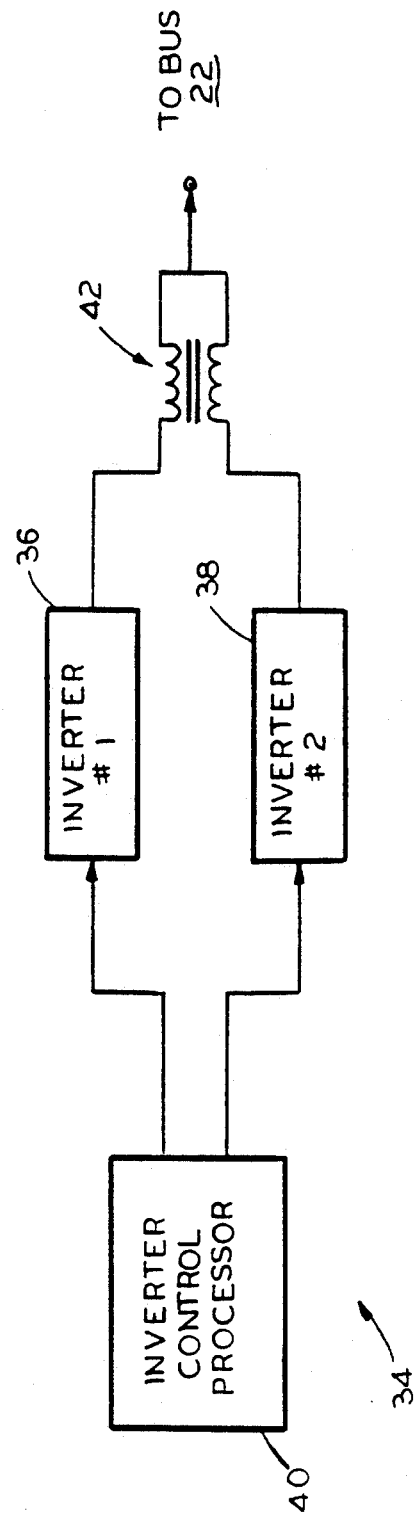
FIG. 2 is a combined schematic and block diagram of the dual inverter system of FIG. 1 in a conventional form.

With reference also to FIG. 2, the dual inverter system 34 in one known form for one phase is illustrated. The inverter system 34 includes dual inverters 36 and 38 controlled by an inverter control processor 40. The inverter control processor 40 forms part of the GCU 26, see FIG. 1.

The structure of the inverters 36 and 38 may take one of many known forms. For example, the PWM inverters 36 and 38 may comprise voltage source inverters having six power switches connected in a three-phase bridge configuration. Each of the power switches receives base drive commands from the inverter control processor 40 to control the output voltage of the inverters 36 and 38 by varying the duty cycle of the PWM signals. The DC supplied to the inverters 36 and 38 comprises the DC voltage on the DC link 32, see FIG. 1.

The corresponding phase outputs of the inverters 36 and 38, only one of which is shown, are connected in parallel through an inductive element 42 comprising an interphase transformer. Non-ideal switching characteristics in the inverters 36 and 38 cause a DC potential to develop across the interphase transformer 42. The DC potential causes a DC current to flow. This DC current is limited only by the resistance of the interphase transformer 42. The DC current sums with the developed AC current, which increases power losses in the inverters 36 and 38 and in the interphase transformer 42. The DC current also causes a bias flux on the core of the interphase transformer 42.

The total flux excursion available in the interphase transformer 42 is a fixed number limited by the type of magnetic material used in winding the same. Because part of the flux excursion must be used for flux caused by DC current, the resulting magnetic design of the interphase transformer 42 must be larger, more inefficient and heavier as the DC voltage/current increases. The current rating of the inverters 36 and 38 must also be increased to compensate for the DC current flowing on top of the normal AC current, resulting in the inverter design being larger, more inefficient and heavier as the DC voltage and current increases.

Figure 4:
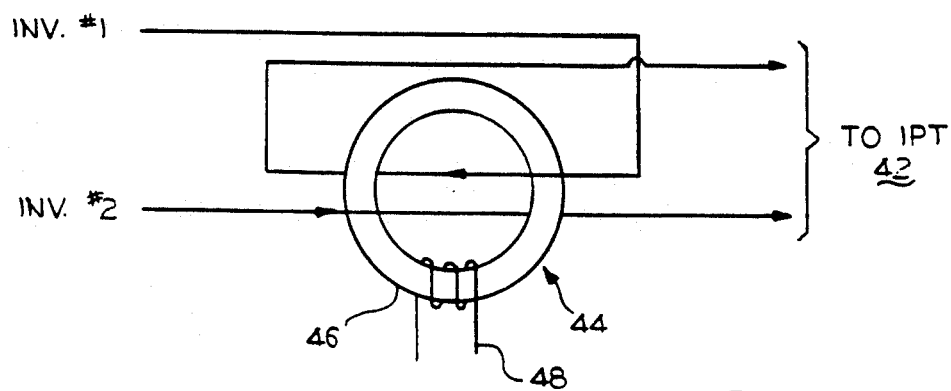
FIG. 4 is a schematic diagram illustrating connection of a current transformer for sensing differential current from the dual inverters of FIG. 3.

The DC content in the output from the inverters 36 and 38 is controlled by sensing the output from the inverters 36 and 38 differentially. Particularly, with reference to FIG. 3, a current transducer 44 senses the primary currents for each phase differentially. As illustrated in FIG. 4, the current transducer 44 comprises a current transformer 46 in the form of a ring through which the output from the second inverter 38 passes directly and the output from the first inverter 36 passes oppositely prior to connection to the interphase transformer 42. By differentially sensing the currents, the load current is removed from the resultant sensed value. The remaining currents are the interphase transformer excitation current and the DC current flowing in the interphase transformer 42. Indeed, the resulting current sensed by the current transducer 44 is equal to twice the interphase transformer excitation current summed with twice the DC current flowing through the interphase transformer 42.

Figure 3:
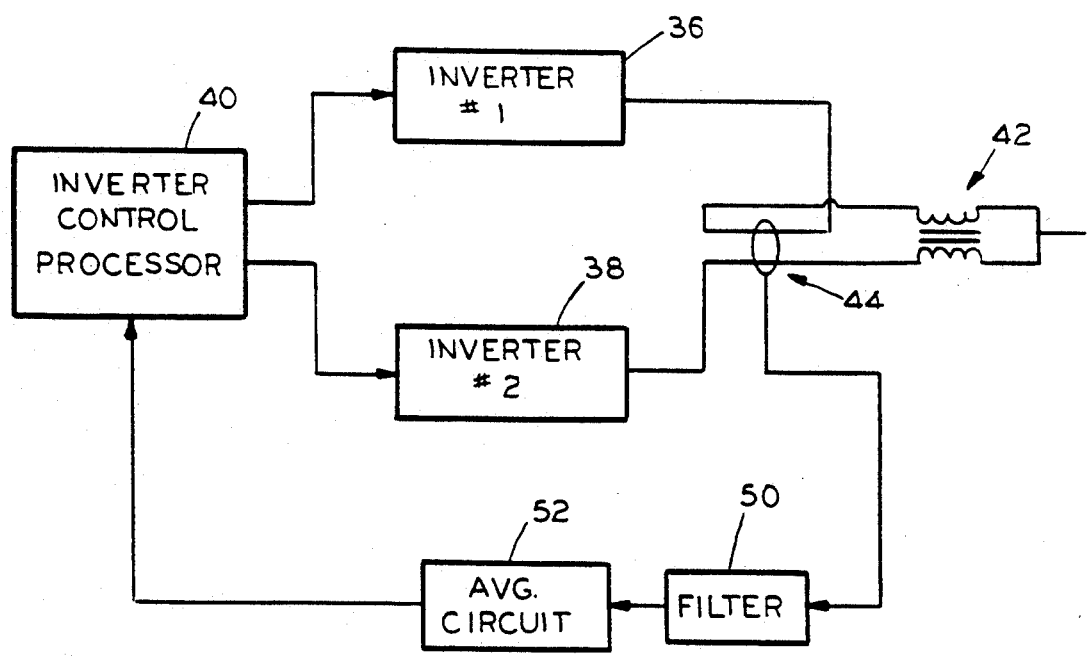
FIG. 3 is a combined schematic and block diagram of the dual inverter system of FIG. 1 in accordance with the invention.

The differential current through the current transformer 46 is sensed by a winding 48, see FIG. 4, connected to a filter circuit 50, see FIG. 3. The filter circuit strips the AC content from the sensed circuit to develop a signal proportional to the DC current flowing through the interphase transformer 42. The output of the filter circuit 50 is coupled through an averaging circuit 52 to the inverter control processor. The averaging circuit stabilizes the output from the filter circuit 50.

The inverter control processor 40 develops base drive signals to the inverters 36 and 38. The base drive signals are modified in accordance with the signal from the averaging circuit 52 to minimize the DC current. Particularly, the inverter control processor 40 may include an inverter control circuit such as shown and described in Roe et al., U.S. Pat. No. 4,882,120, owned by the assignee hereof, the specification of which is hereby incorporated by reference herein. This patent discloses an inverter control for minimizing DC content as by dithering the inverter base drive signals to modify the PWM patterns. The inverter control processor 40 could control each inverter 36 and 38 identically. Alternatively, the inverter control processor 40 may be provided to phase shift the base drive signals to the respective inverters 36 and 38 180°. This results in the signals being in phase at the fundamental frequency and out of phase at the harmonics to further minimize higher harmonics.

Thus, controlling and limiting the DC current to a minimum value allows the interphase transformer 42 and inverters 36 and 38 to be designed to be smaller, more efficient and lighter than could be obtained without any such control.

The disclosed embodiment of the invention illustrates the broad inventive concepts to provide reduced DC current.

We claim:

1. In an electric power system with dual inverters having outputs connected in parallel to an inductive element for connection to a load, a control comprising:
    a single current transducer operatively associated with the outputs of both inverters for sensing differential current from said inverters, said differential current representing current circulating in said inductive element and eliminating load current, wherein inaccuracies resulting from use of separate current sensors are avoided;

an inverter control connected to said current transducer for developing pulse width modulated control signals to said inverters to reduce differential current sensed by said current transducer.

2. The control of claim 1 wherein said current transducer comprises a current transformer sensing output from one inverter differentially from that of the other inverter.

3. The control of claim 1 further comprising a filter circuit connected between said current transducer and the inverter control, said filter developing a signal proportional to DC current flowing through the inductive element.

4. The control of claim 3 wherein said inverter control modifies the pulse width modulated control signals to minimize DC current flowing through the inductive element.

5. A DC content control for dual pulse width modulated inverters having outputs connected in parallel to an interphase transformer for connection to a load, comprising:

current transducer means operatively associated with the outputs of both inverters including a single current sensor, for sensing DC current flowing in the interphase transformer as by eliminating load current without the inaccuracies resulting from use of separate current sensors; and an inverter control connected to said current transducer means for developing pulse width modulated control signals to said inverters to reduce DC current sensed by said current transducer means.

6. The control of claim 5 wherein said current transducer means comprises a current transformer sensing output from one inverter differentially form that of the other inverter.

7. The control of claim 6 wherein said current transducer means further comprises a filter circuit connected between said current transformer and the inverter control, said filter developing a signal proportional to DC current flowing through the interphase transformer.

* * * * *